July 25, 1933.  H. F. MERRIAM  1,919,342
PRODUCTION OF SULPHUR
Filed July 9, 1931
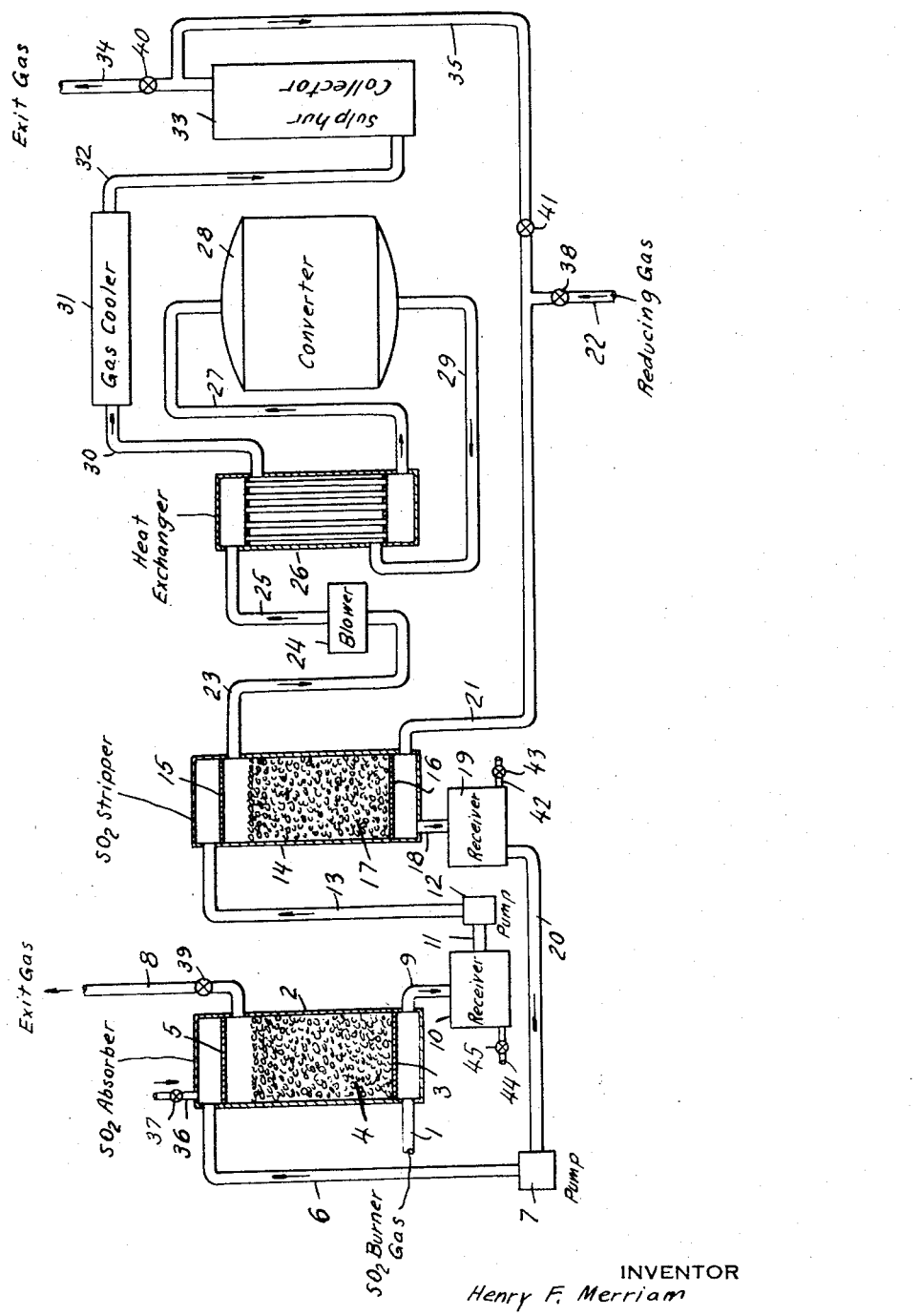
INVENTOR
Henry F. Merriam
BY
ATTORNEY Patented July 25, 1933

1,919,342

UNITED STATES PATENT OFFICE

HENRY F. MERRIAM, OF WEST ORANGE, NEW JERSEY, ASSIGNOR TO GENERAL CHEMICAL COMPANY, OF NEW YORK, N. Y., A CORPORATION OF NEW YORK

PRODUCTION OF SULPHUR

Application filed July 9, 1931. Serial No. 549,632.

The invention relates to the production of sulphur, and particularly to a process for producing elemental sulphur from gas mixtures containing sulphur dioxide, oxygen and gaseous impurities, such as gas mixtures obtained from roasting or smelting furnaces and the like.

It has been proposed heretofore to produce elemental sulphur from gas mixtures containing sulphur dioxide and oxygen by admixing therewith reducing gases in such quantities as to provide reacting proportions of reducing and reducible gases, and then subjecting the gas mixture to the action of a catalyst at an elevated temperature. The sulphur dioxide was thereby reduced, and the sulphur subsequently separated from the reaction gases by cooling and deposition. It has also been suggested that sulphur dioxide might be separated from a gas mixture by absorbing the sulphur dioxide in a suitable absorbent, as water or a dilute acid, and that the sulphur dioxide thus absorbed might then be released from the absorbing medium by the action of a current, or stream of air.

Sulphur dioxide gas mixtures, to the treatment of which the present invention relates, as a rule contain quantities of oxygen largely in excess of the amount of sulphur dioxide. According to prior processes for the production of elemental sulphur from such gases, it has been the practice to add to these gas mixtures, reducing gases in such quantities as to provide reacting proportions of reducing and reducible gases. Because of the comparatively large amount of oxygen contained in the gas mixtures over and above the oxygen combined with the sulphur, it has been necessary, in order to effect substantially complete reduction of the sulphur, to employ reducing agents in sufficient quantities not only to reduce the sulphur dioxide, but also to combine with the free oxygen contained in the gas mixtures. Such processes are wasteful of fuel or other reducing agents used for bringing about the reduction of sulphur, since large quantities of the reducing agents employed act only to combine with the free oxygen of the gas mixture, and thus serve no useful purpose in the actual reduction of sulphur dioxide.

It is the primary object of the present invention to provide a process for the production of elemental sulphur from commercially obtainable gas mixtures containing sulphur dioxide and oxygen whereby minimum amounts of reducing agents are required to bring about reduction of the sulphur, so that the production of sulphur from such gas mixtures may be effected much more economically than heretofore. Another object of the invention is to provide a process whereby sulphur dioxide may be separated from a gas stream and obtained either in a pure form or in admixture with reducing gases, or in any event in a gas mixture containing no constituents which uselessly consume reducing agents in the subsequent reduction procedure. In brief, the invention is directed to a process for the reduction of sulphur from gas mixtures containing sulphur dioxide and oxidizing gases in which only such quantities of reducing agents are utilized as are necessary to effect the reduction of the sulphur dioxide.

In the practice of the invention a gas containing sulphur dioxide, for example a burner gas, may be contacted with a suitable absorbing agent, such as water, whereby the sulphur dioxide is largely absorbed and removed from the gas stream. Preferably, the sulphur dioxide is then removed from the absorbent by and at the same time admixed with a reducing gaseous medium which is passed in contact with the absorbent. The resulting mixture of sulphur dioxide and reducing gas may, if desired, be heated through heat exchange, and then reacted to produce elemental sulphur, preferably in the presence of a catalytic agent and at an elevated temperature. The sulphur thus produced may be separated from the reaction mixture by cooling and deposition in a suitable chamber.

More particularly, the passage of the initial gas mixture through the absorbing medium, such as water, is preferably in accordance with the countercurrent principle. Removal of the sulphur dioxide from the absorbing medium may be effected by passing a reducing gaseous medium therethrough preferably also countercurrently. The reducing gaseous medium employed for this purpose may be any suitable gas capable of reducing sulphur dioxide, as methane, carbon monoxide, hydrogen, either alone or in various mixtures, as producer gas, water gas, coal gas, natural gas, etc. Furthermore, the removal of sulphur dioxide, may be accomplished under the influence of heat whereby a more complete separation of the sulphur dioxide is effected, and the sulphur dioxide concentration of the gas mixture increased. The amount of reducing gaseous medium contacted with the absorbing agent is preferably such that there will be obtained a mixture of sulphur dioxide and reducing gas in such proportions as will reduce the sulphur dioxide to sulphur. The mixture of sulphur dioxide and reducing gas may then be conducted in heat exchange relation with a heating medium, such for example as the reacted gaseous mixture, to a suitable converter in which the sulphur dioxide and reducing gas are reacted, preferably in the presence of a catalyst, to bring about the formation of sulphur. The reaction mixture from the converter is cooled, and the sulphur condensed and separated from the gas.

The conditions under which the reduction of sulphur dioxide is carried out should be such that the production of compounds of sulphur other than elemental sulphur is reduced to a minimum. The constituents of the original gaseous mixture other than sulphur dioxide are largely separated from the sulphur dioxide in the absorption step, and a substantially pure sulphur dioxide is thus obtained. The inert gases accompanying the reducing gas used for removing sulphur dioxide from the absorbing medium pass from the sulphur separator or collector and may be permitted either to dissipate in the atmosphere or may be used as a diluting means for reducing the gaseous medium in order to adjust the quantity of reducing agent to that required to effect efficient reduction of the sulphur dioxide. Other inert gases, of course, may be used as diluents.

For a fuller understanding of the nature and objects of the invention reference should be had to the following detailed description taken in connection with the accompanying drawing in which there is illustrated diagrammatically and partly in section an arrangement or procedure in accordance with which the process of the invention may be practiced.

An apparatus suitable for carrying out the invention comprises an absorber 2 having an inlet pipe 1 at the bottom and below a perforated plate 3. Upon the perforated plate there is placed a filling material 4, as pebbles, coke, broken refractories, Raschig rings, etc. for the purpose of providing an extended surface of contact between an ascending gaseous stream and a descending absorbent. In the upper part of the absorber there is positioned a perforated plate 5 for distributing the absorbent and leading to the space above the plate is a pipe 6 for the introduction of absorbent through the action of a pump 7. The absorber 2 is provided also with an exit pipe 8 having a valve 39 positioned near the top beneath the plate 5 and a liquid outlet 9 at the base and beneath the lower perforated plate 3. Connected with the pipe 9 is a receiver 10 which is connected with a pump 12 by a pipe 11. A conduit 13 leads from the pump 12 to a stripper 14 with which it connects at the top and above a distributing plate 15. Within the stripper 14 is a lower perforated plate 16 supporting a filling material 17. The material collecting in the bottom of the stripper 14 is led away by a pipe 18 to a receiver 19 from which it may be conducted to the pump 7 by a conduit 20.

The introduction of a reducing gaseous medium is effected through a pipe 22 having a valve 38 and a conduit 21 which opens into the base of the stripper 14 beneath the perforated plate 16. From the stripper 14, a pipe 23 connects with a blower 24, and the blower in turn by a pipe 25 with a heat exchanger 26. A conduit 27 connects the heat exchanger with a converter 28. In order to accomplish heat exchange, the converter is connected by a pipe 29 with the heat exchanger, and therefrom a pipe 30 leads to a cooler 31 which is connected by a conduit 32 with the collector 33. The collector is provided with an outlet 34 controlled by a valve 40. From the outlet 34, a conduit 35, having a valve 41, leads to the reducing gas inlet 22. An absorbent inlet 36, provided with a valve 37, is connected to the top of the absorber 2 for the introduction of liquid above the distributing or perforated plate 5. The receivers 10 and 19 have outlets 44 and 42 respectively, which outlets may be closed by the valves 45 and 43, respectively.

As an illustrative embodiment of a manner in which the invention may be carried out in practice, the following example is given:

A gas mixture containing sulphur dioxide and oxygen, which may be obtained from a smelter or sulphide roaster, may be introduced by the inlet 1 beneath the lower perforated plate 3 of the absorber 2, and contacted therein with a suitable absorbing liquid, as water, or dilute acid introduced either through the pipe 6 or the pipe 36 and being distributed over the filling material within the converter by the distributing plate 5. Contacting of the sulphur dioxide gas with the absorbing liquid on the countercurrent principle effects the solution of the sulphur dioxide while permitting the insoluble gaseous constituents, particularly the excess oxygen, nitrogen, etc. to pass therethrough, and from the absorber by the exit gas outlet 8. The absorbing liquid holding the sulphur dioxide in solution collects beneath the lower plate 3, and is conducted to the receiver 10 by the pipe 9.

From the receiver the sulphur dioxide solution is forced to the top of the stripper 14 by means of the pipe 11, pump 12 and pipe 13, and is introduced thereinto near the top and above the distributing plate 15. The solution passes down through the stripper over the filling material and is contacted during its descent with a reducing gaseous medium which may be coal gas, producer gas, natural gas, etc., whereby the sulphur dioxide content is removed. The stripped absorbent flows from the stripper by the passage 18 into receiver 19 from which, by the pipe 20, it is conducted to the pump 7 and from thence to absorber 2, thus completing the circuit and permitting reuse of the absorbent. If desired, the release or removal of the sulphur dioxide in the stripper 14 may be facilitated and a larger proportion of the sulphur dioxide driven out of the absorbent by conducting the stripping operation under the influence of heat, for example, by raising the temperature of the saturated solution 15 to 25° C. whereby the sulphur dioxide concentration of the resulting gas mixture may be increased. Since the sulphur dioxide concentration is increased by heating, the volume of the gases is cut down thus reducing the size of the apparatus involved and the plant investment. For example, where the original burner gas contains say 8% sulphur dioxide, by heating the saturated solution, the concentration of the gas from the stripper may be raised to 12–15% sulphur dioxide. The heating of the stripper may be accomplished by any suitable means not shown or the increased temperature in the solution may be brought about by heating the absorbing liquid prior to the admission of the same into the stripper.

The passage of the reducing gaseous medium through the stripper occasions the formation of a mixture of sulphur dioxide and reducing gas, the reducing gas being admitted in the proportions which are suitable to effect a complete reduction of the sulphur dioxide to sulphur in a succeeding stage of the operation. The mixture of sulphur dioxide and reducing gas passes from the stripper through pipe 23 connected with a blower, and is forced through the heat exchanger in which the gaseous mixture is heated by heat transfer with the hot reaction mixture. The heated gases are then led by the pipe 27 to the converter 28 in which reaction between the sulphur dioxide and the reducing gas takes place with the formation of elemental sulphur. The action between the sulphur dioxide and reducing gas may be brought about either under the influence of a high temperature or in the presence of a suitable catalyst, such as dehydrated bauxite under proper conditions of temperature and pressure. The temperature at which the reaction between the sulphur dioxide and reducing gases takes place depends on the nature of the catalyst and the composition of the gases.

The hot reaction gases pass from the converter to the heat exchanger by the pipe 29 and from thence by a conduit 30 to the gas cooler 31 in which cooling of the reaction mixture is brought about, and to the desired extent for subsequent separation of the sulphur after the gases are conducted from the cooler to the sulphur collector 33. The sulphur may be deposited in the collector by mechanical means, as the provision of baffles therein, or by other type of collector, and the residual gases pass from the collector through the exit gas outlet 34. If desired, the exit gases may be used as a diluent, for the proper proportioning of the content of reducing gas in the reducing gaseous medium by conducting part of the exit gas back to the pipe 21 by means of the valved conduit 35.

In starting the operation, the liquid absorbent may be introduced through the valved inlet 36 to the absorber 2, and this inlet may also be used to effect replacement of such absorbent as may be lost during the operation of the process. Further, if desired, the absorber may be operated at a temperature below normal temperature, as at a temperature of about 15° C., although absorption at normal temperatures, i. e. around 20° C. is generally contemplated. In the foregoing procedure, the amount of absorbing liquid, for example, may be controlled in such a manner as to obtain the desired absorption of the sulphur dioxide. The absorption preferably is made as complete as possible and the absorbing liquid is utilized in an amount at least sufficient to absorb substantially all of the sulphur dioxide present in the burner gas.

Instead of absorbing the sulphur dioxide in a liquid absorbing medium such as water or dilute acid, solid adsorbents such as silica gel may be employed. When solid adsorbents are utilized, the adsorbed sulphur dioxide is released therefrom in any suitable manner, for example by heating the adsorbent or by stripping by means of the reducing gas. Whatever absorbing or adsorbing medium is employed, the oxygen present in the original gas mixture together with the gaseous impurities are eliminated, with the result that the fuel consumed per unit of sulphur produced is materially reduced, and the sulphur of the sulphur dioxide is ultimately recovered in a pure form.

The converter or chamber in which the sulphur dioxide and reducing gas are reacted may be, and preferably is maintained at a temperature above that at which the sulphur produced will be retained therein, for example, above about 300° C.

The relative proportions of sulphur dioxide and reducing gas should be in amounts approximating the proportions required for reaction thereof to produce sulphur. The proper temperature of the gases for introduction into the converter or reacting chamber may, as shown above, be secured by preheating the gases in a suitable heat exchanger where they are brought in indirect heat exchanger relation with the hot gases passing from the converter.

Reaction between the sulphur dioxide and reducing gas may be effected without a catalytic agent, but the action is facilitated by the employment of a suitable catalyst. As a catalyst, utilization may be made of dehydrated bauxite which is a natural mixture of hydrated alumina, iron oxide, titanium oxide, etc., or use may be made of iron oxide, pyrites cinder, titanium oxide, aluminum oxide, calcium sulphate, calcium sulphide, and others. The temperature of the reacting chamber should be maintained so as to occasion reaction between the sulphur dioxide and the reducing gas without occasioning undesirable side reactions. Interaction of the sulphur dioxide with the reducing gases in the converter, or reaction chamber is considered to take place, by way of illustration, according to the following equations:

$$2CO + SO_2 = 2CO_2 + S$$
$$CH_4 + 2SO_2 = CO_2 + 2H_2O + 2S$$
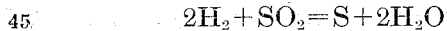
$$2H_2 + SO_2 = S + 2H_2O$$

The reaction mixture arising in the converter is passed through a suitable heat exchange apparatus for heat transfer to the incoming gases and then through a cooler to reduce the temperature of the gases for subsequent deposition of the sulphur in the collector. The collector may be of a mechanical type such as a baffle chamber with fixed or rotating baffles or the sulphur may be separated or precipitated electrostatically. Further, the collector may be of a washer type in which the sulphur is dissolved, for example in a suitable oil, or washed out with water or adsorbed in a suitable adsorbent, as dehydrated bauxite. When a collector of the mechanical type is used, liquid sulphur may be deposited therein and continuously withdrawn by suitable regulation of the temperature at about 125° to 200° C.

The usual operation of the process will result in the interaction of practically all of the sulphur dioxide and consequently the exit gases from the sulphur collector will not require further treatment prior to their admission to the stack and then to the air. However, under certain conditions, it may be desirable to provide for the removal of any hydrogen sulphide or sulphur dioxide in the exit gas by passing these gases through a suitable adsorber, thereby preventing their escape. The absorbed gases may be subsequently recovered and returned to the process.

The production of sulphur according to the foregoing procedure may be accomplished commercially with a substantially complete utilization of the entire sulphur dioxide content of the burner gases and may be readily and economically carried out. The invention provides a process by which the impurities present in the original burner gases are eliminated and only a pure sulphur dioxide reacted with the reducing gas, which in turn, yields a pure sulphur. The important advantage is obtained that the oxygen content of the gases treated is removed, which results in a material reduction in the consumption of fuel per pound of sulphur obtained. Further the concentration of the sulphur dioxide gases may be increased, particularly if the solution of sulphur dioxide is heated during the stripping operation, which expedient requires a lower plant cost in view of the decreased volume of gases passing through the system or apparatus.

The invention is not limited to the production of elemental sulphur, as for example, the principles of the invention may also be utilized for the production of hydrogen sulphide. The latter sulphur compound may be formed by employing any one of the aforementioned hydrogen-containing reducing agents in sufficient quantities to continue the reduction of the sulphur dioxide to hydrogen sulphide.

Since certain changes may be made in carrying out the above process without departing from the scope of the invention, it is intended that all matter contained in the above description shall be interpreted as illustrative and not in a limiting sense.

Where the sulphur dioxide is separated from the initial gas mixture by a liquid such as water or by a solid such as silica gel, it is believed that the phenomena involved are of absorption and adsorption respectively. Whatever the case may be, and whatever substance may be employed to separate the sulphur dioxide from the other constituents of the initial gas mixture, in the appended claims the term "absorbing" is intended to include both phenomena.

I claim:

1. A process for the production of sulphur which comprises contacting a gas containing sulphur dioxide with an absorbing agent, removing sulphur dioxide from the absorbing agent by means of a reducing gaseous medium and reacting the sulphur dioxide and reducing gas in the presence of a catalyst to form sulphur.

2. A process for the production of sulphur which comprises contacting a gas containing sulphur dioxide with a liquid absorbing agent, removing sulphur dioxide from the absorbing agent by means of a reducing gaseous medium and reacting the sulphur dioxide and reducing gas in the presence of a catalyst to form sulphur.

3. A process for the production of sulphur which comprises contacting a gas containing sulphur dioxide with a liquid absorbing agent, removing sulphur dioxide from the absorbing agent by passing a reducing gaseous medium therethrough under the influence of heat, and reacting the sulphur dioxide and reducing gas in the presence of a catalyst to form sulphur.

4. The process for treating gases which comprises contacting a gas containing sulphur dioxide with an absorbing agent, removing sulphur dioxide from the absorbing agent by means of a reducing gaseous medium, and reacting the sulphur dioxide and the reducing gas.

5. The process for treating gases which comprises contacting a gas containing sulphur dioxide with an absorbing agent, removing sulphur dioxide from the absorbing agent by means of natural gas, and reacting the sulphur dioxide and natural gas in the presence of a catalyst.

6. A process for the production of sulphur which comprises contacting a gas containing sulphur dioxide with water, removing sulphur dioxide from the water solution by means of a reducing gaseous medium, and reacting sulphur dioxide and reducing gas in the presence of a catalyst to form sulphur.

7. A process for the production of sulphur which comprises contacting a gas containing sulphur dioxide with water in countercurrent flow, removing sulphur dioxide from the water solution by means of a reducing gaseous medium, and reacting sulphur dioxide and reducing gas in the presence of a catalyst to form sulphur.

8. A process for the production of sulphur which comprises contacting a gas containing sulphur dioxide with water in countercurrent flow at a temperature of about 20° C., removing sulphur dioxide from the water solution formed by passing producer gas therethrough countercurrently under the influence of heat, reacting the sulphur dioxide and producer gas in the presence of a catalyst to form sulphur and separating the sulphur by cooling.

9. A process for the production of sulphur which comprises contacting burner gas containing sulphur dioxide with water, removing sulphur dioxide from the water solution formed by means of a reducing gaseous medium, reacting the sulphur dioxide and reducing gas in the presence of a catalyst to form sulphur, and separating the sulphur.

10. A process for the production of sulphur which comprises contacting burner gas containing 5 to 12 per cent. sulphur dioxide with water at a temperature of about 20° C., removing sulphur dioxide from the water solution thus formed by passing producer gas therethrough while maintaining the temperature of the solution upwards of about 35° C., reacting the sulphur dioxide and producer gas in the presence of a catalyst to form sulphur and separating the sulphur from the residual gas.

11. A process for the production of sulphur which comprises contacting burner gas containing 5 to 12 per cent. sulphur dioxide with water at a temperature of about 20° C. countercurrently, removing sulphur dioxide from the water solution thus formed by passing producer gas therethrough countercurrently while maintaining the temperature of the solution upwards of about 35° C., heating the gaseous mixture, reacting the sulphur dioxide and producer gas in the presence of a catalyst to form sulphur and separating the sulphur from the residual gas by cooling.

12. A process for the production of sulphur which comprises contacting a gas containing sulphur dioxide with an absorbing agent, removing sulphur dioxide from the absorbing agent by means of a reducing gaseous medium, and reacting the sulphur dioxide and reducing gas to form sulphur.

13. In a process for the production of sulphur from a gas containing sulphur dioxide, the improvement which comprises removing sulphur dioxide from an absorbing agent by means of a reducing gaseous medium and reacting the sulphur dioxide and reducing gas to form sulphur.

14. In a process for the production of sulphur from a gas containing sulphur dioxide, the improvement which comprises removing sulphur dioxide from an absorbing agent by means of a reducing gaseous medium and reacting the sulphur dioxide and reducing gas in the presence of a catalyst to form sulphur.

15. In a process for the production of sulphur from a gas containing sulphur dioxide, the improvement which comprises removing sulphur dioxide from an absorbing agent by means of a reducing gaseous medium.

16. In a process for the production of sulphur from a gas containing sulphur dioxide, the improvement which comprises removing sulphur dioxide from an absorbing liquid by contacting producer gas therewith countercurrently.

17. In a process for the production of sulphur from a gas containing sulphur dioxide, the improvement which comprises removing sulphur dioxide from an absorbing liquid by contacting producer gas therewith countercurrently under the influence of heat.

18. A process for the production of sulphur which comprises contacting a gas containing sulphur dioxide with water in countercurrent flow at a temperature of about 20° C., removing sulphur dioxide from the water solution formed by passing natural gas therethrough countercurrently under the influence of heat, reacting the sulphur dioxide and natural gas in the presence of a catalyst to form sulphur and separating the sulphur by cooling.

19. A process for the production of sulphur which comprises contacting burner gas containing 5 to 12 per cent. sulphur dioxide with water at a temperature of about 20° C. countercurrently, removing sulphur dioxide from the water solution thus formed by passing natural gas therethrough countercurrently while maintaining the temperature of the solution upwards of about 35° C., heating the gaseous mixture, reacting the sulphur dioxide and natural gas in the presence of a catalyst to form sulphur and separating the sulphur from the residual gas by cooling.

20. The process for treating gases which comprises contacting a gas containing sulphur dioxide with a liquid absorbing agent, removing sulphur dioxide from the absorbing agent by means of a reducing gaseous medium, and reacting the sulphur dioxide and the reducing gas.

21. The process for the reduction of sulphur dioxide of a gas mixture containing sulphur dioxide, an oxidizing gas and gaseous impurities which comprises contacting the gas mixture with an absorbing agent whereby the sulphur dioxide is absorbed and separated from the oxidizing gas and the gaseous impurities, separating sulphur dioxide from the absorbing agent in the absence of an oxidizing gas, and then reacting the sulphur dioxide and a reducing agent.

22. The process for the production of an oxygen-free sulphur dioxide gas mixture from a gas mixture containing sulphur dioxide and oxygen which comprises contacting an oxygen-sulphur dioxide containing gas mixture with an absorbing agent whereby the sulphur dioxide is absorbed and separated from the oxygen, and then removing the sulphur dioxide from the absorbing agent by means of an oxygen-free gaseous medium.

23. The method of treating gases containing sulphur dioxide and oxygen which comprises contacting the gases with an absorbing agent whereby the sulphur dioxide is absorbed and separated from the oxygen, and then removing sulphur dioxide from the absorbing agent by flowing through the absorbing agent an oxygen-free fluid medium whereby sulphur dioxide is separated from the absorbing agent and a fluid oxygen-free sulphur dioxide mixture is obtained.

24. In the process for the reduction of sulphur dioxide involving stripping of sulphur dioxide from a sulphur dioxide absorbent containing the same with reducing gaseous medium, and then reacting the sulphur dioxide and reducing medium, the improvement which comprises effecting stripping with the reducing medium in the presence of inert gas.

25. In the process for the reduction of sulphur dioxide involving stripping sulphur dioxide from a sulphur dioxide absorbent containing the same with reducing gaseous medium, reacting the sulphur dioxide and reducing medium, and separating sulphur reaction products from inert tail gases in the reaction gas mixture, the improvement which comprises diluting reducing medium in the stripping zone with inert tail gases.

26. In the process for the reduction of sulphur dioxide involving stripping sulphur dioxide from a sulphur dioxide absorbent containing the same with gas containing reducing medium, reacting the sulphur dioxide and reducing medium, and separating sulphur reaction products from inert tail gases of the reaction gas mixture, the improvement which comprises admixing with the reducing medium entering the stripping zone tail gases in such quantities as to facilitate stripping of the sulphur dioxide from the absorbent and to provide in the exit gases of the stripping zone substantially reacting proportions of sulphur dioxide and reducing medium.

HENRY F. MERRIAM.